United States Patent
Gable

(10) Patent No.: US 9,285,973 B1
(45) Date of Patent: Mar. 15, 2016

(54) SYSTEMS AND METHODS FOR DETECTING AND DISPLAYING BIAS

(71) Applicant: ALLSIDES, INC., San Francisco, CA (US)

(72) Inventor: John Gable, San Francisco, CA (US)

(73) Assignee: John S Gable, San Francisco, CA (US)

( * ) Notice: Subject to any disclaimer, the term of this patent is extended or adjusted under 35 U.S.C. 154(b) by 307 days.

(21) Appl. No.: 13/961,822

(22) Filed: Aug. 7, 2013

Related U.S. Application Data

(60) Provisional application No. 61/681,065, filed on Aug. 8, 2012.

(51) Int. Cl.
   *G06F 3/048* (2013.01)
   *G06F 3/0484* (2013.01)

(52) U.S. Cl.
   CPC .................................. *G06F 3/04847* (2013.01)

(58) Field of Classification Search
   CPC ............................ G06Q 30/02; G06F 3/04847
   See application file for complete search history.

(56) References Cited

U.S. PATENT DOCUMENTS

| | | | |
|---|---|---|---|
| 8,200,685 B2 | 6/2012 | Song et al. | |
| 2008/0120166 A1* | 5/2008 | Fernandez | G06Q 30/02 702/179 |
| 2008/0183551 A1* | 7/2008 | Jain | G06Q 30/00 705/26.3 |
| 2011/0289078 A1* | 11/2011 | Woodard | G06F 17/30884 707/723 |
| 2012/0266023 A1* | 10/2012 | Brown | G06F 11/3684 714/32 |
| 2013/0183023 A1* | 7/2013 | Sandrew | G11B 27/034 386/286 |

OTHER PUBLICATIONS

Groseclose, et al. A Measure of Media Bias. Quarterly Journal of Economics. 2005; 120(4): 1191-1237.

* cited by examiner

*Primary Examiner* — Omar Abdul-Ali

(57) ABSTRACT

Systems and methods are provided of evaluating content for bias. The biases of participants, content, and/or sources are considered. Bias ratings are calculated for participants, content, and/or sources and affect one another. A user interface is provided for content, such as news media content showing a bias rating for the content.

11 Claims, 17 Drawing Sheets

FIG. 9B

How do these news sources rate?

| Source | Rating |
|---|---|
| ABC | |
| Bloomberg | |
| CBN | R |
| CBS | |
| CNN | |
| Fox News | R |
| HotAir | R |
| Huffington Post | L |
| Los Angeles Times | |
| NBC | |
| New York Times | |
| Newsmax | R |
| Newsweek | |
| NPR | |
| Politico | L |
| Time Magazine | |
| Town Hall | R |
| U.S. News and World Report | |
| USA Today | |
| Wall Street Journal - News | |
| Wall Street Journal - Opinion | R |
| Washington Post | |
| Washington Times | |
| WND News | R |

FIG. 15

SYSTEMS AND METHODS FOR DETECTING AND DISPLAYING BIAS

CROSS-REFERENCE

This application claims the benefit of U.S. Provisional Application No. 61/681,065 filed Aug. 8, 2012, which application is incorporated herein by reference in its entirety.

BACKGROUND OF THE INVENTION

Conventional technology has been provided to group news, opinion, and other articles relating to the same event or topic. Such grouped information is provided with the intent to allow users to easily read event-based news and opinion articles. For this purpose technologies have been provided for classifying news articles, opinions, or other information covering the same event or same topic.

However, challenges remain in distinguishing viewpoints in a variety of articles. A need exists to inform users of biases of news and other articles, and the underlying sources who wrote those articles, thereby permitting them to easily read news and other articles in an informed manner.

SUMMARY OF THE INVENTION

The invention provides systems and methods for detecting and displaying bias of the source, as well as of written content and of individuals. Various aspects of the invention described herein may be applied to any of the particular applications set forth below. The invention may be applied as a standalone media analysis system or as a component of an integrated software solution. The invention can be optionally integrated into existing business and processes seamlessly, for example, media provider and/or aggregation services. It shall be understood that different aspects of the invention can be appreciated individually, collectively or in combination with each other.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 9B shows another example of a media presentation provided by a third party.

FIG. 15 provides an example of bias ratings for various news sources.

DETAILED DESCRIPTION OF THE INVENTION

In the following detailed description, numerous specific details are set forth in order to provide a thorough understanding of the invention. However it will be understood by those of ordinary skill in the art that the invention may be practiced without these specific details. In other instances, well-known methods, procedures, and components have not been described in detail so as not to obscure the invention. Various modifications to the described embodiments will be apparent to those with skill in the art, and the general principles defined herein may be applied to other embodiments. The invention is not intended to be limited to the particular embodiments shown and described.

Aspects of the invention may be directed to systems and methods for detecting source bias. A media analysis system may include a bias engine that can create crowd-driven bias ratings of sources. A bias score may be determined. In some embodiments, the systems described herein may be capable of multi-bias media coverage. The systems may compare and associate coverage of the same news story and opinions/ editorials on the same topics based on the bias of the sources.

Figure 1:
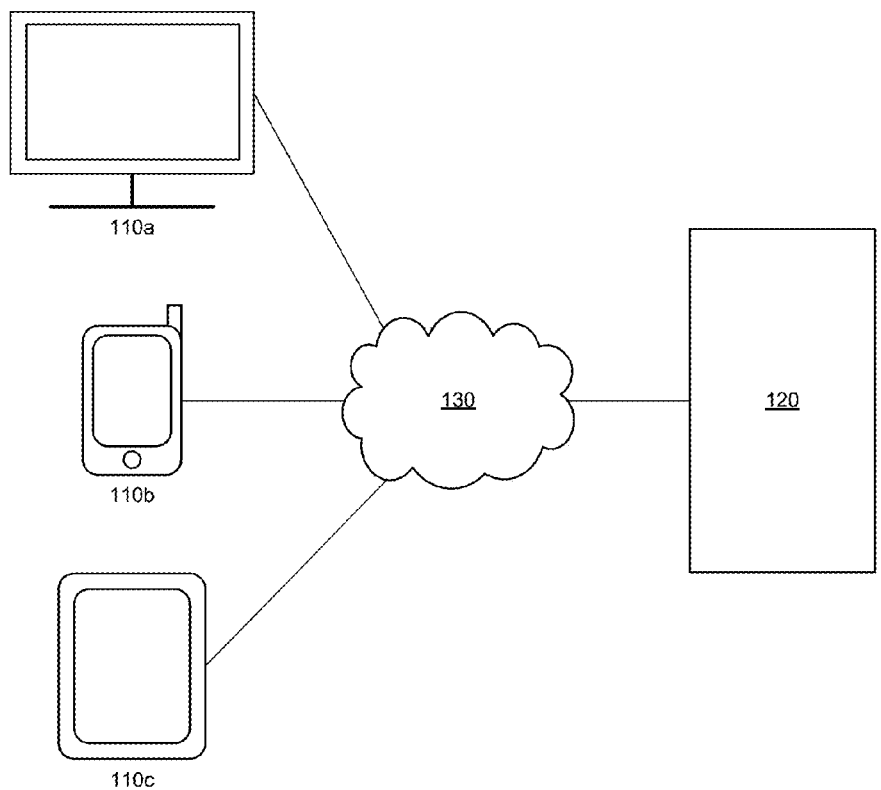
FIG. 1 shows an example of a media analysis system provided in accordance with an embodiment of the invention.

FIG. 1 shows an example of a media analysis system provided in accordance with an embodiment of the invention. One or more devices 110a, 110b, 110c may be in communication with one or more servers 120 of the media analysis system over a network 130.

One or more user may be capable of interacting with the system via a device 110a, 110b, 110c. In some embodiments, the user may be a participant or source, of content, or may be somehow associated with or affiliated with the participant or source. A user may be an individual or entity that may view content, provide content, rate content, or otherwise interact with the content.

The device may be a computer 110a, laptop, or mobile device (e.g., tablet 110c, smartphone 110b, cell phone, personal digital assistant) or any other type of device. The device may be a networked device. The device may have a memory, processor, and/or display. The memory may be capable of storing persistent and/or transient data. Those persistent and/ or transient data may be stored in the cloud. Non-transitory computer readable media containing code, logic, or instructions for one or more steps described herein may be stored in memory. The processor may be capable of carrying out one or more steps described herein. A display may show data and/or permit user interaction. For example, the display may include a screen, such as a touchscreen, through which the user may be able to view content, such as media content. The device may receive user input via any user input device. Examples of user input devices may include, but are not limited to, mouse, keyboard, joystick, trackball, touchpad, touchscreen, microphone, camera, motion sensor, optical sensor, or infrared sensor. The display may be capable of displaying images (e.g., still or video), text. The device may be capable of providing audio content.

The device 110a, 110b, 110c may be capable of communicating with a server 120. Any description of a server may apply to one or more servers and/or databases which may store and/or access content and/or analysis of content. Analysis of content may include bias analysis. One or more bias engine may be provided on the one or more servers and/or be in communication with one or more servers. The one or more servers may include a memory and/or programmable processor. A plurality of devices may communicate with the one or more servers. Such communications may be serial and/or simultaneous.

The programmable processor of the server may execute one or more steps as provided therein. Any actions or steps described herein may be performed with the aid of a programmable processor. Human intervention may not be required in automated steps. The programmable processor may be useful for analyzing content and/or providing bias information. The server may also include memory comprising non-transitory computer readable media with code, logic, instructions for executing one or more of the steps provided herein. For example, the server(s) may be utilized to perform bias analyses. Analysis may occur with aid of the processor. The server(s) may receive ratings, such as bias ratings from one or more participants or sources and may optionally store such information. The information may be stored in memory (e.g., databases or other memory storage units). The server(s) may access such information when evaluating the biases of content, sources, and/or participants.

The device 110a, 110b, 110c may communicate with the server 120 via a network 130, such as a wide area network (e.g., the Internet), a local area network, or telecommunications network (e.g., cellular phone network or data network). Communication may also be intermediated by a third party.

In one example, a user may be interacting with the server via an application or website. For example, a browser may be displayed on the user's device. For example, the user may be viewing content, such as media content, via the user's device. The user may view a bias score or other bias-related analysis of the content via the user's device. The bias information and the content may be displayed in a visually associated manner on the user's device video and/or audio display.

Figure 2A:
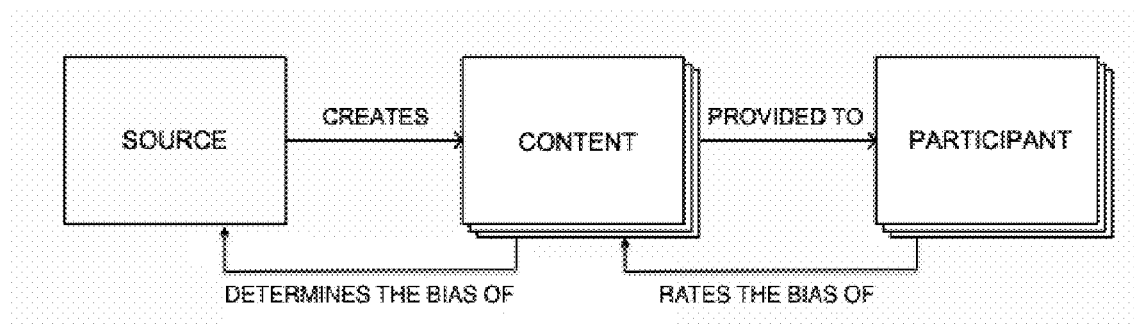
FIG. 2A provides an example of entities involved in a media analysis system.

FIG. 2A provides an example of entities involved in a media analysis system. For example, a content source, content, and participant may interact with one another. In some embodiments, a source may create the content. One or a plurality of different sources may be involved in the creation of the content. The sources may develop the content independently or in concert. The sources may provide content to one, two or more content providers (e.g., media distributors, news sources, blogs, websites). Optionally, one, two or more content providers may determine the bias of a source.

Content may be provided to one or more participants. The participants may view and/or hear the content. The participants may be exposed to the content via one or more device. For example, the participants may be exposed to the content via a computer, mobile device, phone, television, movie screen, electronic billboard, or any other source. The content may include media content, such as news, updates, blogs, opinions, articles, television or other programming, shows, advertisements, or any other content. Content may be directed to various subject areas, such as health, nutrition, parenting, fashion, politics, news, sports, food, products, travel, arts, business, or any other information. Content may pertain to any topic and need not be from a news or media source. The participants may or may not interact with the content. The participant may view a single content item, or multiple content items simultaneously. Similarly, the content may be broadcast to multiple participants, or may be presented to a participant at a time or upon request. Any combination thereof may be provided. In some instances, participants may be sources of content.

In some instances, participants may receive content through content providers. One, two or more participants may rate the content for bias. In some instances, the participants may also rate bias of the content providers and/or the sources of information.

Content may be biased. In some embodiments, the source of the content may be biased and such source bias may be incorporated into the content. In some instances, the participants may be biased. Such bias may be evaluated and/or quantified. Some examples of bias may include bias based on political viewpoints, demographics (e.g., geography, region, age, gender, religion, ethnicity, race, education, profession, financial status), philosophical beliefs, culture or any other factors or combinations thereof. For example, a bias scale may be provided between eastern or western medicine, organics vs. non-organic, or any other scale.

In some embodiments, bias may be presented in along a single dimension. Alternatively, biases may be presented along multiple dimensions (e.g., two or more, three or more, or four or more dimensions). One example where multiple dimensions of biases may apply may include political beliefs, where one dimension may go from "left" to "right". Another dimension may go from "traditional" to "progressive." User biases may fall into any combinations of these categories. For example, a bias may be "to the left" and "traditional", another bias may be "to the right" and "traditional", and another bias may be "at the center" and "progressive." In another example, multiple bias dimensions may be provided for a product review. For example, multiple dimensions may relate to the product's usability, depth of functionality, flexibility, end user experience, and administrator control.

In some instances, a number of bias categories for rating content, source, or a participant may be pre-fixed or designed to fall within a preselected range. For example, it may be desired to have five bias rating categories for a user to select from. Alternatively, it may be permissible for there to be four to seven bias rating categories. In some alternative embodiments, the number of bias categories may not matter.

The systems and methods described herein may determine the bias categories that are presented to a participant for rating. In one example, a source, content provider, bias rating system user, third party, or participant may determine the bias rating categories. For example, an administrating at a bias rating system may select the bias categories to be presented. In another example, a third party displaying content may select which bias categories the third party wishes to have shown and/or assessed. In another example, bias categories may be determined with aid of a processor in an automated fashion. The bias categories may be determined without requiring human intervention. For example, one, two or more bias dimensions may be provided. Survey data may be collected relating to the various bias dimensions.

Figure 18:
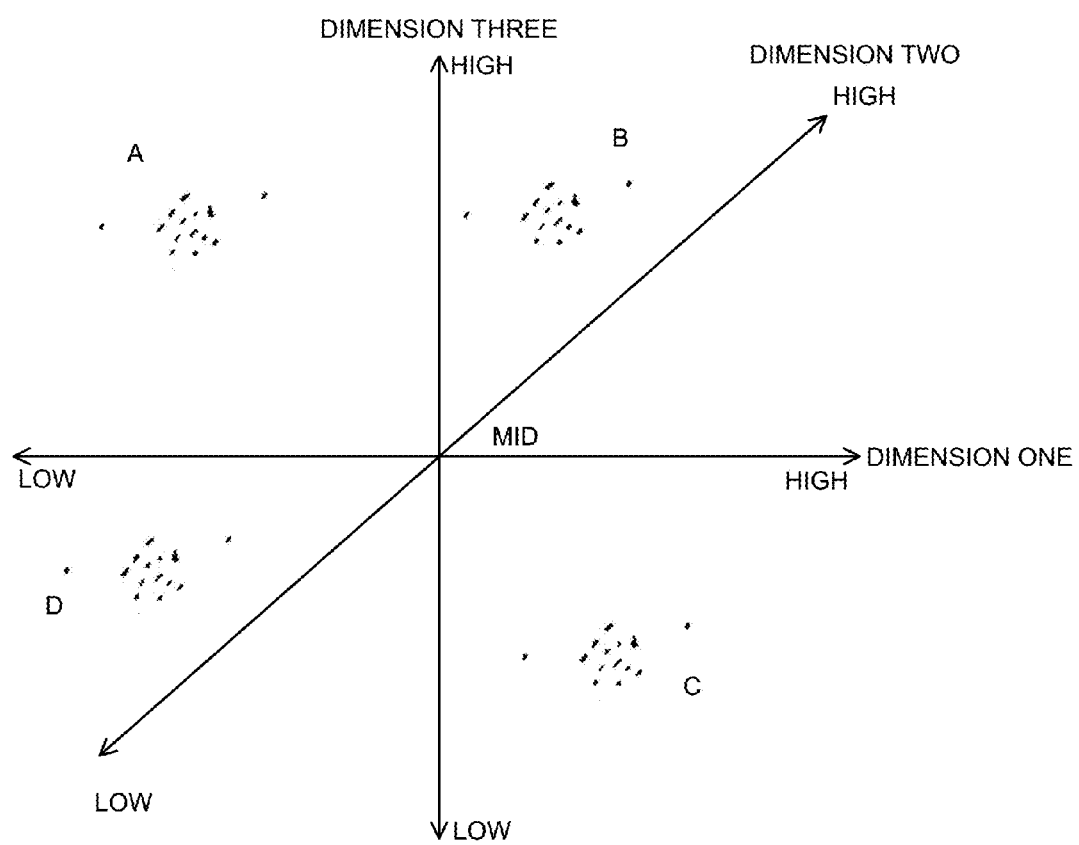
FIG. 18 provides an example of multi-dimensional clustering.

One or more clusters of bias data may be formed. For example, as shown in FIG. 18, if three bias dimensions are analyzed, the data plots in accordance with the three dimensions may be provided and may form one or more cluster of data in close proximity to one another. For example, Dimension One may run from Low to High, Dimension Two may run from Low to High, and Dimension Three may run from Low to High. Ratings along each dimension may be plotted as a point along all three dimensions. The various ratings may have a tendency to form clusters (e.g., Clusters A, B, C, and D). There may be outlier ratings that may not fall into clusters. In some instances, the clusters may be used to determine the bias rating categories. For example, the bias rating categories may be based on Cluster A (Dimension One Low, Dimension Two Low, Dimension Three High), Cluster B (Dimension One High, Dimension Two High, and Dimension Three High), Cluster C (Dimension One High, Dimension Two Low, Dimension Three Low), and Cluster D (Dimension One Low, Dimension Two Low, Dimension Three Mid). In some instances, any number of clusters may be formed. In some instances, the top clusters may be selected to fall within a preselected number or range of bias rating categories. In some embodiments, in order to become bias rating categories the clusters may exceed a predetermined concentration threshold. For example, the clusters may be formed having a concentration (e.g., number of ratings along a line (e.g., one dimension), within an area (e.g., two dimensions), volume (e.g., three dimensions), or a range for any number of dimensions). The bias rating categories may each be provided with their own name or label, or may incorporate the various dimensions.

Figure 19:
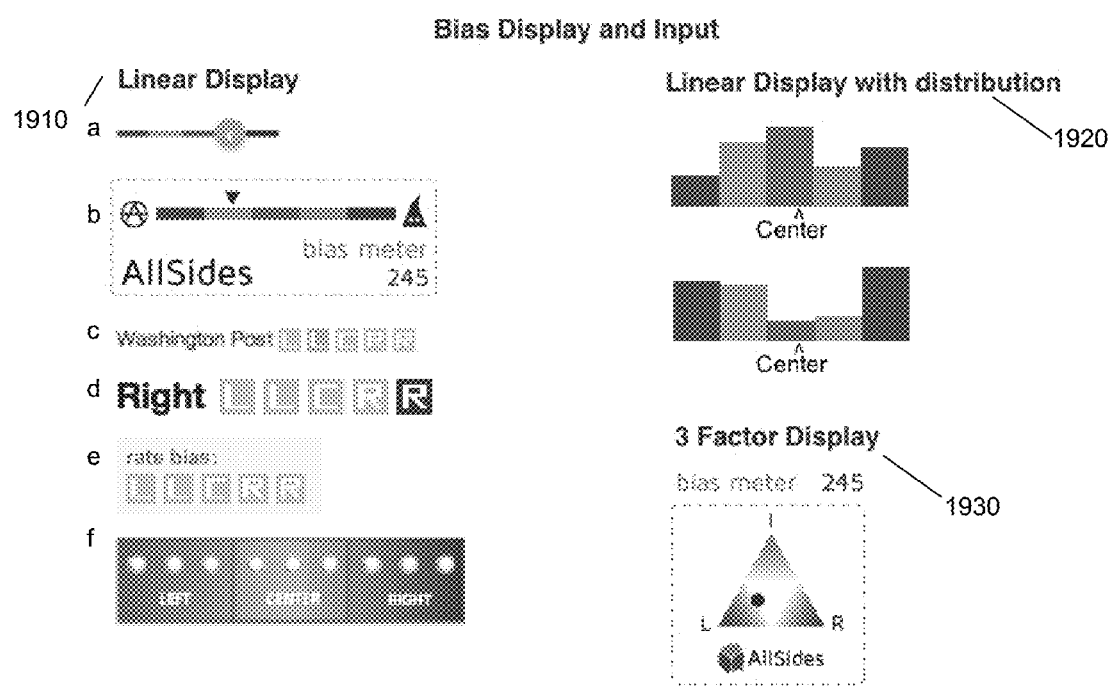
FIG. 19 shows examples of displays of various bias ratings.

FIG. 19 shows examples of displays of bias ratings. In some instances, a linear display 1910 of bias ratings may be provided. The linear display may be presented in any manner (e.g., continuous sliding scale, sliding scale with marked categories 1910a, 1910b, discrete categories 1910c, 1910d, 1910e, or categories with subcategories 1910f. Bias ratings can be determined along any scale (e.g., bear to bull, left to right 1910a, traditional to progressive, nature to science, etc.). In some examples, the bias may not yet have been set 1910e, 1910f, and the user may click, drag, or select a rating and send their input through this same display interface.

Bias display ratings may be displayed as a linear display with distribution 1920. The distribution of ratings in each bias category may be shown. In some instances, various bias ratings may have the same overall bias score (e.g., Center, as shown in FIG. 19) but have different distributions. In some instances, a label may be provided for the overall bias score.

A three factor display 1930 may be used to show bias distribution. The three factor display may show a final bias score as well as distribution. A three factor display may be useful when the distribution across three factors are shown simultaneously. In some instances, any multi-factor display can be used to show distribution. Any polygonal shape having any number of vertices can be used to show the distribution over the various factors represented by the various vertices. For example, a four factor display can be shown as a square. A five factor display can be shown as a pentagon. A six factor display can be shown as a hexagon.

Figure 17:
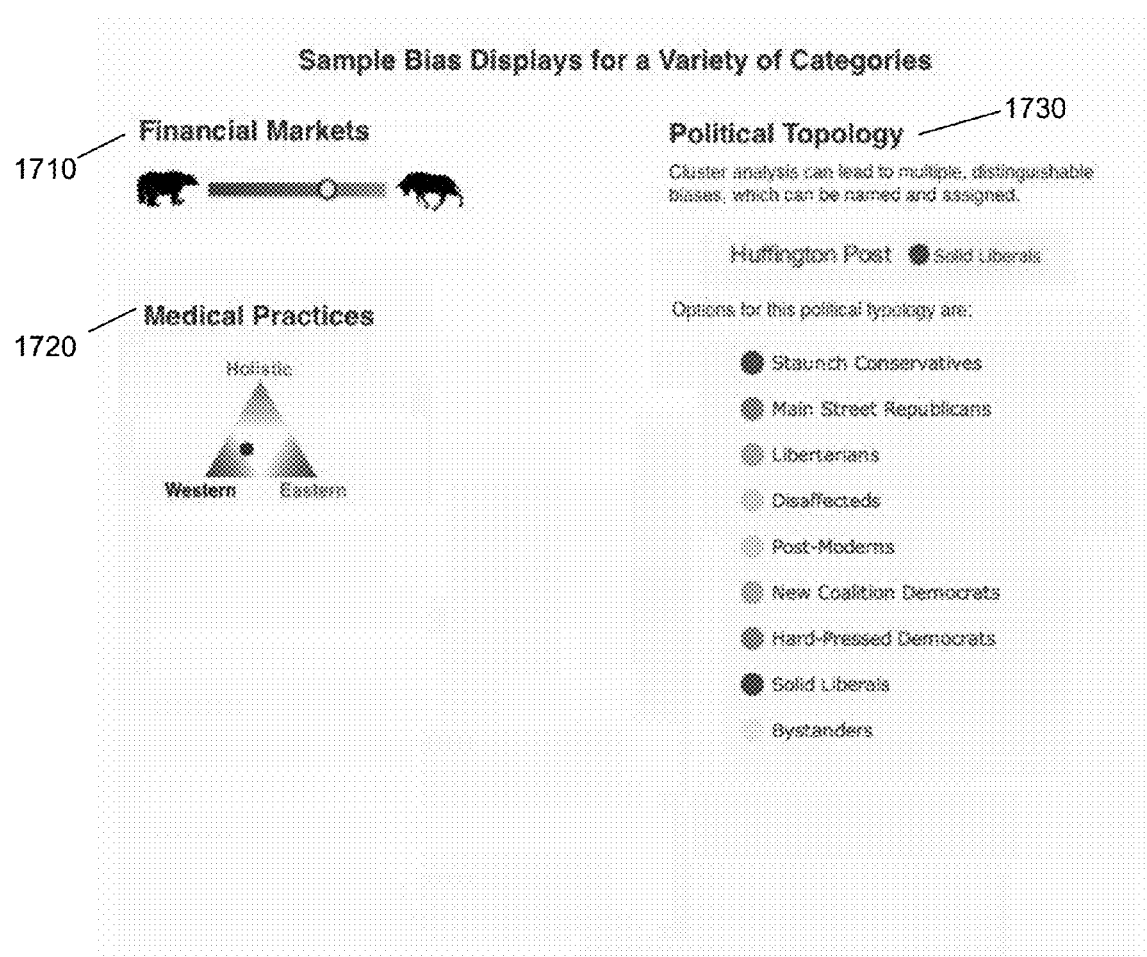
FIG. 17 provides examples of displays of bias ratings of various types.

FIG. 17 provides examples of displays of bias ratings of various types. For example, an example may pertain to financial markets 1710. For instance, a continuous sliding scale may be provided from bear to bull. Any other linear scale may be incorporated for difference bias categories or types.

Another example of a bias rating may apply to medical practices 1720. A three-factor bias display may relate to Western, Eastern, and Holistic medicine. Any multi-factor display may be provided for various bias categories or types.

Cluster analysis may lead to multiple, distinguishable biases. For example, bias rating categories for political typology 1730 may be provided. For example opinions for political typology may include categories such as staunch conservatives, main street republicans, libertarians, disaffected, postmoderns, new coalition democrats, hard-pressed democrats, solid liberals, and bystanders. The bias ratings may be marked as discrete categories. Rather than assigning one or two factors, biases may be assigned based on identified clusters of bias as defined by cluster analysis research.

In some embodiments, the display of bias may be provided alongside one or more, or each content item (e.g., search result, each article). In some instances, the display of bias may be provided alongside one or more, or each description of a content source (e.g., each news source).

Figure 2B:
FIG. 2B provides an example of an overview of a bias rating system.

FIG. 2B provides an example of an overview of a bias rating system. One or more factors may be used to determine a bias rating. In some examples, a participant bias may be determined. This may be self-reported by the participant, or may be determined by other sources. In some examples, a participant may be a viewer of content.

Another example of a factor may include a bias rating for content. The bias rating for content may be provided by a participant, such as a viewer of the content, a content provider, a source of the content, or any combination thereof. In one example, the bias of an article, opinion, review, or other type of content may be rated.

An additional factor may be how content bias is rated by bias groups. For example, the bias of individuals or groups rating content bias may be taken into account. For example, whether the bias reviewer is conservative or liberal may play a role in whether how their bias rating of content is reviewed or analyzed.

A bias factor may also include what the average bias rating for several items from a source. For example, the same source may provide multiple content items. The various content items from the source may be reviewed for bias. The average bias ratings for the multiple items of content may be averaged or considered. This may play a role in determining a bias of the source. In one example, multiple articles from a news source may be rated and averaged. This may be a factor in determining bias for future content from the source.

An overall bias rating may be formulated based on one or more of the factors. For example, the overall bias rating may depend on one or more, two or more, or three or more of the following: participant bias, content bias, how bias groups rate the content, and the average bias rating for content from a source. The various factors may be considered equally or some factors may be weighted more than others. In the example provided in FIG. 2B the overall bias is found to be "center." The information used to determine the overall bias may be stored in memory of a bias rating system, or may be accessible from third party databases via the bias rating system.

Figure 3:
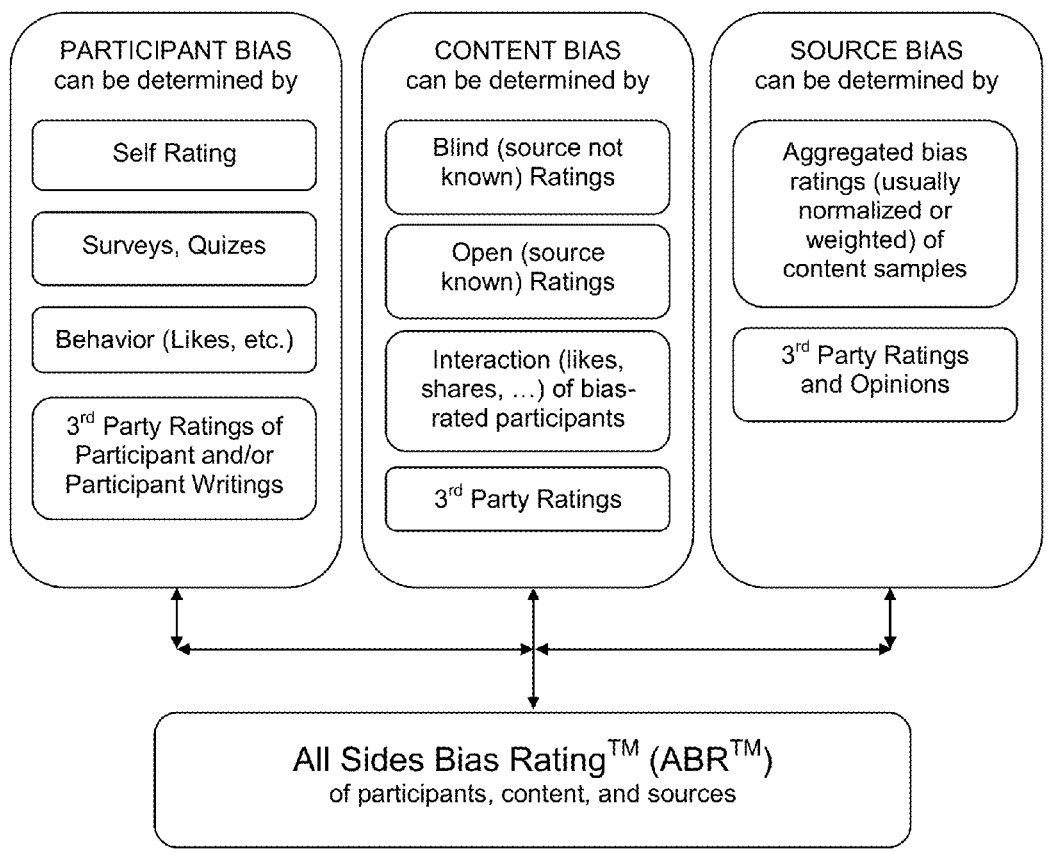
FIG. 3 shows an example of a bias rating system provided in accordance with an embodiment of the invention.

FIG. 3 shows an example of a bias rating system provided in accordance with an embodiment of the invention. A bias engine may be utilized to provide a bias rating. The bias engine may include and/or consider one or more of the following major components:

1. Participant bias ratings
2. Content bias ratings
3. Source bias ratings
4. An incorporated bias rating.

In some embodiments, the participant bias, content bias, and source bias may feed into an incorporated bias rating. The incorporated bias rating may be an overall bias rating. The incorporated bias rating may encompass bias ratings of participants, content, and/or sources. The participant bias may be based on self rating and/or may be behavior based. The content bias may be based on blind review and/or open review. The source bias may be based on content analysis and/or open review.

In some embodiments, the participant bias, content bias, and/or source bias may be used to evaluate one another. For example, participant bias may be determined based on content bias. Content bias may be determined based on source bias and/or participant bias. Source bias may be determined based on content bias and/or participant bias.

1. Participant Bias Ratings.

The bias of a system's members and participants may be calculated by direct and/or indirect methods. These methods include (a) self-rating dashboard, (b) survey or quiz, (c) behavior based determinations and/or (d) third party ratings of a participant and/or participant writings.

1(a): Self-Rating.

In some embodiments, a self-rating dashboard may be provided. The self-rating dashboard may be provided on a user interface of a device. The self-rating dashboard may be provided to a user, such as a participant.

On this dashboard, there may be one or several different attributes (e.g., one, two, three, four, five, six, seven, eight, nine, ten, or more, or can be any number of attributes) for which an individual can choose where they fall on a scale for each attribute. The scale may be a linear scale. In alternate embodiments, the scale may be an exponential scale, logarithmic scale, or any other type of scale. The scale may have a numerical value. For example, the scale may have a minimum value and a maximum value (e.g., 0 to 10, 0 to 100). The user may also choose the relative importance of each attribute. An overall bias score may be calculated as a weighted average. In other words, the score for each attribute can be weighted according to that attribute's relative importance. A higher numerical weight may be granted to an attribute deemed to be more important. A lesser numerical weight may be granted to an attribute deemed to be less important.

In one example, a linear scale can be set in a variety of ways. For example, for political bias, a scale from 0-100 can be used. The scale can be broken into the following categories:

| Rating | Range | Midpoint |
|---|---|---|
| Left (L) | 80-100 | 90 |
| Lean Left (LL) | 60-80 | 70 |
| Center (C) | 40-60 | 50 |
| Lean Right (LR) | 20-40 | 30 |
| Right (R) | 0-20 | 10 |

Another example of how it may be broken down is as follows:

| Rating (sub-category name) | Range | Midpoint |
|---|---|---|
| Right (Far Right) | 0-14 | 7 |
| Right (Solid Right) | 14-27 | 20 |
| Right (Lean Right) | 27-40 | 33 |
| Center (Right Center) | 40-47 | 43 |
| Center (Solid Center) | 47-53 | 50 |
| Center (Left Center) | 53-60 | 57 |
| Left (Lean Left) | 60-73 | 67 |
| Left (Solid Left) | 73-86 | 80 |
| Left (Far Left) | 86-100 | 93 |

Within a scale, any number of categories may be provided. For example, as shown above, about five categories may be provided. In other examples one or more, two or more, three or more, four or more, five or more, six or more, seven or more, eight or more, nine or more, ten or more, twenty or more, thirty or more, fifty or more categories may be provided. In some instances, the linear scale may be divided evenly between the categories. For example, the total range of the linear scale may be divided by N if N categories are provided. For example, if the total range is 100 and a total of five categories are provided, each category may have about a 20 unit range. In other examples, the categories need not be evenly divided. Each category may be assigned a range in the scale. The categories may follow a substantially continuous spectrum (e.g., more right-leaning toward more left-leaning)

In some embodiments, each category may be assigned a value. The value may be based on the range within the categories. For example, the midpoint may be the midpoint in the range of the categories. In other embodiments, the value may be calculated based on any other type of statistical information about the range of the categories.

Each attribute can be assigned a level of importance. For example, within a self-rating dashboard, users can also be asked how important each attribute is to them. Numerical weights may be provided based on how important the attributes are. The range of numerical weights may be selected as desired. For example, the numerical weights may range from 0 to 1, 0 to 4, 0 to 10, or any other range, depending on the desired gradation. In one example, the weighted factor for each can be as follows:

| Level of Importance | Weighted Average Factor |
|---|---|
| Not at all | 0 |
| Somewhat | 1 |
| Average | 2 |

| Level of Importance | Weighted Average Factor |
|---|---|
| Very | 3 |
| Extremely | 4 |

Using a weighted average, a single self rated "General Bias" rating can be assigned. The assignment may occur as provided below:

Attribute Score=Rating×Importance
  Rating may be a value (e.g., the midpoint #) for the Rating Level the user picks (ex: CR=30). Alternatively, the user may pick an exact value and the rating may be that value (e.g., user picks 32).
  Importance may be the weighted average factor for the Importance Level the user picks (ex: Somewhat Important=1)
"General Bias" Score=Sum of Attribute Scores/Sum of Importance The systems and methods provided herein may permit a user to use this methodology to rate his or her own bias. Examples of self rating interfaces are provided elsewhere herein.

Figure 4:
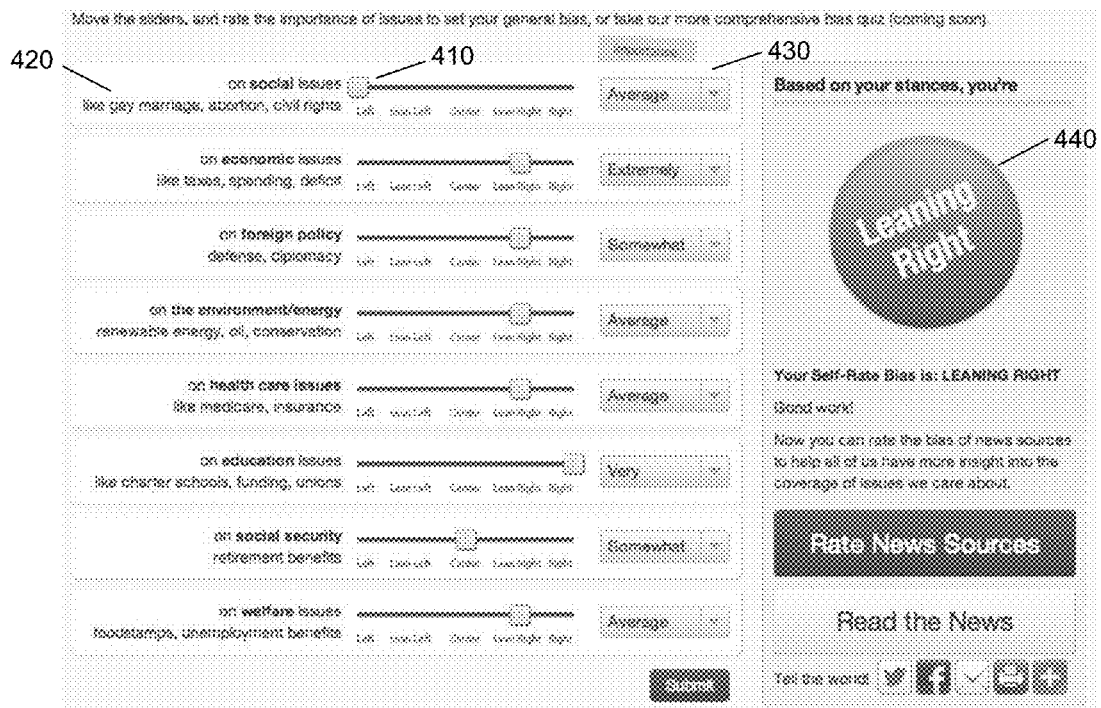
FIG. 4 shows an example of a self-rating dashboard in accordance with an embodiment of the invention.

FIG. 4 shows an example of a self-rating dashboard in accordance with an embodiment of the invention. The self-rating dashboard may be displayed on a user interface of a device. In some embodiments, one or more sliders 410 may be provided that may enable a user to select his or her rating for various attributes 420. Examples of such attributes may include where the user stands on social issues, economic issues, foreign policy, the environment/energy, health care issues, education issues, social security, welfare, and/or any other issues. In one example, multiple categories may be provided to the user (e.g., left, lean left, center, lean right, right). In some instances, each attribute may be capable of receiving a rating from a user. In some embodiments, a user may be capable of selecting a user rating that falls into one of the categories. In some instances, the user options may be discrete so that the user may only be able to select from one of the categories presented. In other embodiments, the user options may be continuous so the user may be able to select anywhere on the scale (anywhere along the spectrum of left to right). In some embodiments, a user may select a category from a drop down menu or enter a value, or provide any other indication of the user's self-rating of attributes.

An option may be provided that may permit a user to rate the importance of each attribute 430. In some embodiments, a default option may be provided (e.g., average). Any number of options may be provided for the user to select from when weighting the attributes (e.g., extremely, somewhat, average, below average, not important). In some instances, the options may be provided in a drop-down menu. The weighting options may correspond to numerical values. In other embodiments, the user may be able to enter a weighting option. For example, a user may be able to enter a numerical value for the importance of an attribute.

A participant bias-score 440 may be displayed to the user. For example, the user may be determined to have a self-rating bias of center based on the options the user entered for the various attributes. In some embodiments, the bias-score may update in real-time as the user modifies one or more attribute value and/or weighting. In other embodiments, the bias-score may update when a user selects an option to update or at periodic times or in response to predetermined events. For example, based on a user's self-reported stances, the user may be determined to be leaning right, as shown in the example of FIG. 4.

Other self-rating techniques may be utilized in accordance with embodiments of the invention. For example, a self-rating survey or quiz may be employed. A user may answer one or more questions that may assist with assessing the user bias.

1(b): Behavior Based Determinations.

Responses or actions of the user/participant may be analyzed. In some embodiments, responses to content may be analyzed (e.g., agree, disagree, etc.). In other embodiments, reported actions may be analyzed (e.g., voted for candidate A or initiative B). Such responses or actions to assist with determining the bias rating of the user/participant.

2. Content Bias Ratings.

Systems and methods provided herein may be used to calculate the bias of a source. These may include (a) blind content rating (e.g., source not known), (b) open bias rating (e.g., source known), (c) interaction of bias-rated participants (e.g., likes, shares), and/or (d) third party ratings.

2(a): Blind Content Rating.

A content analysis system can use a crowd to determine the bias of a source (an author, entity, publication, content provider, or other source). Examples of user interfaces for blind content rating are provided elsewhere herein.

Participants may be used to rate the content. The participants may or may not know the source of the content. In some embodiments, each participant will have their own bias self-rating, which may be determined using the methods described above or using other methods.

A statistically valid sample of participants representing the full spectrum of bias within the represented area may be used rate the samples of content. In some embodiments, a desired statistical distribution of participants along the spectrum of bias may be used to rate the content. For example, an even number of participants who lean left, right, and center may be used. Alternatively, any distribution of participants may be used and their bias may be used to compensate for their ratings. For example, more left-leaning participants may be available than right-leaning participants. These participants may be weighted accordingly so that the left leaning and right-leaning participants have an overall equal voice.

In accordance with some embodiments of the invention, the bias of content about a specific topic may be rated. A topic can be chosen that may have been covered from many different sources with a variety of opinions and biases. Participants can provide ratings for content. Each participant may be exposed to some of content (e.g., read, watch, listen to some content—typically but not exclusively an article with a headline and body text, could also be a photo, cartoon, video, etc) without knowing the source. Then each participant may be exposed to (e.g., read, watch, listen) alternative content that covers the same topic, again without knowing the source. In some instances, the participant can be exposed to at minimum two items covering the same topic, or can be exposed to many more. For example in some embodiments it may be desirable for the participant to be exposed to two or more, three or more, four or more, five or more, eight or more, ten or more, twenty or more, or thirty or more items covering the same topic.

Then each participant may rate the bias of each item of content, either in comparison to each other or as a raw rating. For example, a comparison rating may include the participant saying that one content is more biased in a certain direction than another content (e.g., content 1 is more left-leaning than content 2). In another example, a raw rating may be a numerical value or categorical selection for the content (e.g., content 1 is rated as left, content 2 is rated as center).

This may be repeated for several different topics. This same procedure may be repeated for many different topics from the same sources. In some embodiments, there may be a minimum number of different topics that may be assessed. For example, it may be preferable to have two or more, three or more, five or more, or ten or more different topics assessed.

Figures 12, 13:
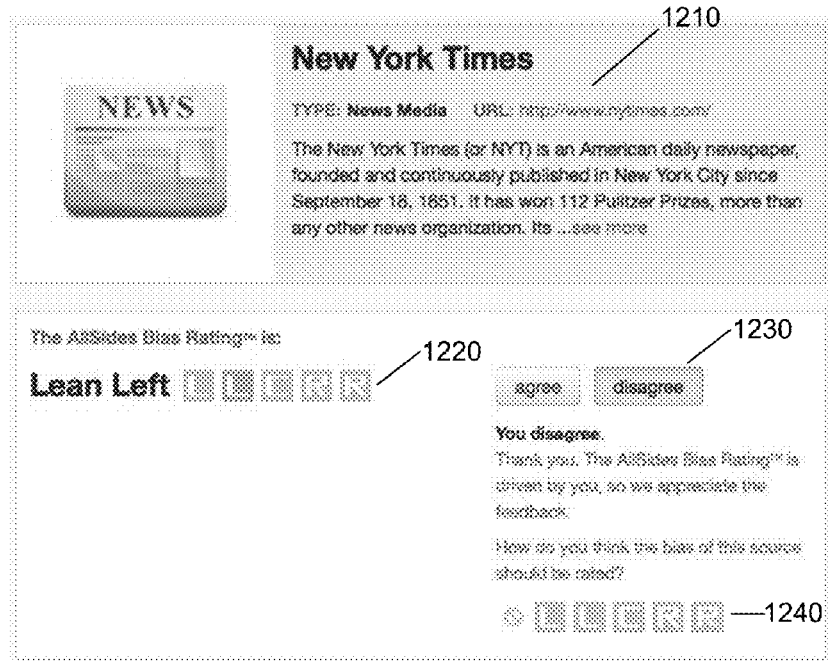
FIG. 12 provides an example of bias rating by direct feedback presenting a user with an option to agree or disagree with a bias rating.
FIG. 13 provides an example of a blind survey though which a user may provide bias feedback.

FIG. 13 provides an example of a survey for a blind rating. The survey may request that a participant rate each topic's bias. In one example, each topic may be a headline from one or more news source. Optionally, the topics may appear in the same order that they are listed by a source. For example, headlines may be listed in the order they appear on a source website. The user may be presented with an option for each topic to provide the user's opinion of the bias of the topic 1310. In some instances, the participant may also be presented with an option to rate the bias of a source based on the topics displayed 1320. For example, the participant may be asked to rate the overall bias of a news source based on the heads displayed. In alternative embodiments, the survey may return an overall bias for a source depending on the individual topic ratings provided by the user. In the blind survey, the user does not know the name of the source of the topics.

The bias of the population may be matched. The bias of a represented area (for example, the United States) may be determined using the same "Participant Bias Ratings" system described above, or alternative system, applied to a valid random sample of people from that represented region. The represented area may be a geographic area or region (e.g., country, state, county, municipality) or may represented a selected population based on other demographics (e.g., age, gender, race, ethnicity, religious beliefs, education, profession, interests, hobbies).

The results from participants can be normalized to match the bias of the represented area. For example, a large number of people may participate in a "source bias rating" survey. They may be rate the bias of the source by evaluating the content that the source writes or otherwise provides. The participant may be blind to and/or unaware of where the content came from or who wrote it. These results may be normalized generally with the nation, world, or any other population. For instances, 22% of the national may have a bias of "lean left." For the participants to participate in the source bias survey, the results of all the participants who "lean left" may impact the source bias survey by 22%. Over half of the participants in the survey could have been "lean left", but regardless of how many people did that, their impact on the study may be 22%.

Other data may be used to normalize the results. For example, Pew Research or another party may have a bias survey that breaks participants into many different categories of bias. They have data that may describe how the nation, world, or other population breaks into those categories. The systems and methods provided herein may have participants in a "source bias survey" first take a short version of the Pew Research or similar study to determine their bias, and then ask them to rate content. Then the results may be normalized to match the breakdown of the nation based on the Pew Research or other ratings.

An overall blind content rating can be calculated as an average of the results of these participant ratings, which may be normalized and balanced to match the biases of the represented area. With an active community and increasing amount of content over time, the bias rating of a source can be constantly evaluated and updated, delivering a dynamic bias rating rather than something set in stone. The systems and methods provided herein may be self-learning as additional information is collected and feedback is provided.

Figure 14A:
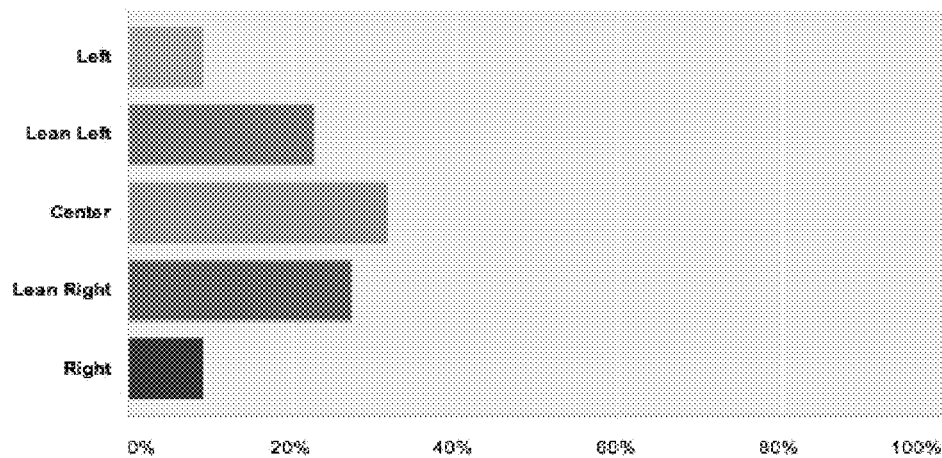
FIG. 14A shows an example of a distribution of bias feedback for a news source.

FIG. 14A shows an example of a distribution of bias feedback for a news source. A plurality of participants may rate a news source. In some instances, the results may be based on a survey (e.g., blind or not blind) conducted by the participants. In this example, the news source may be found overall to be centrally biased.

Figure 14B:
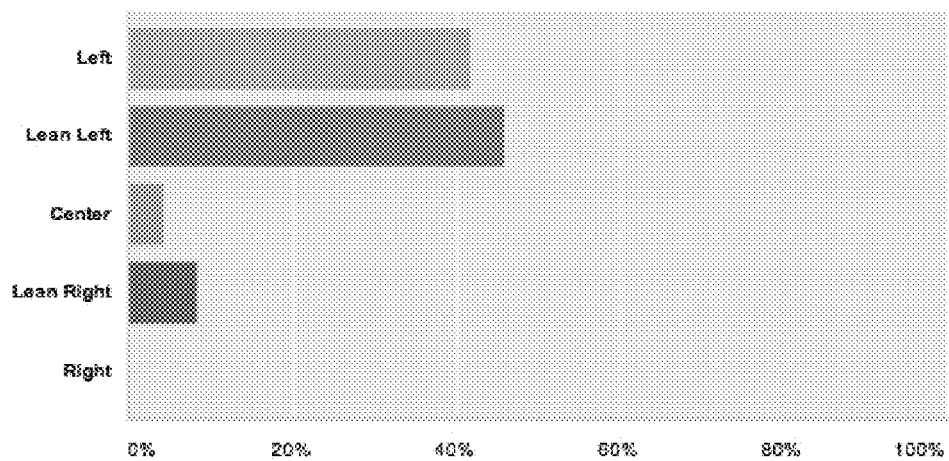
FIG. 14B provides another example of a distribution of bias feedback for a news source.

FIG. 14B provides another example of a distribution of bias feedback for a news source. In this example, the news source may be found to be leaning to the left.

2(b): Participant Bias and Source Bias.

In some embodiments, a content analysis system may not yet have a blind content rating for specific content or other such source. In some situations, a preliminary content rating can be calculated based on the source.

Content is created by a source (e.g., someone or something). If a rated participant created the content, the bias rating for that Participant may impact the content bias rating. Similarly, if from a known, rated source, the bias of the source can impact the content bias rating. In some embodiments, the content bias rating may be the bias rating for the participant and/or source. For example, if a liberal source created the content, the content bias rating may be deemed to be liberal. In some instances, the bias of the participant and/or source may be one of several factors that may be considered when determining content bias. For example, if a conservative source created the content, this may be considered in conjunction with other information about the content, such as participant ratings of the content, such as using techniques described elsewhere herein. This may increase the likelihood that the content itself may be rated to be conservative.

2(c): Interaction of Bias-Rated Participants.

Interaction of bias-rated participants may include tracking and/or using activity of bias-rated participants. For example, a participant's social media activity may be used. In one example, a participant's 'likes' or 'shares' may be used to determine the participant's bias and/or bias of content that the participants is rating or reviewing. For example, if a participant 'likes' a group associated with a political party, the participant's own biases may be considered to fall in that direction. Such information may be considered when rating content.

2(d): Third Party Ratings.

In some embodiments of the invention, third parties may also provide ratings to content. Third parties may be entities and/or individuals. In some instances, third parties may be parties that display content. A third party may be an entity that distinct from an entity operating a bias rating system. A third party may be an entity that is distinct from a source entity.

3. Source Bias Ratings.

Several factors may go into the calculation of a source bias. In some embodiments, source may be determined based on (a) content ratings, (b) participant ratings, and/or (c) content analysis. In some alternate embodiments, the sources may be able to self-rate. Self-rating may utilize one or more techniques described elsewhere herein, such as participant self-rating techniques.

In some examples, the source may be an individual (e.g., author), entity (e.g., company owning a news source), a media provider (e.g., the news source, such as the New York Times), a section of a media provide (e.g., Arts & Leisure section of the New York Times), newscast, channel, TV network, website, blog, or any other type of source.

3(a): Content Ratings.

The source bias can be calculated based on an average of the bias ratings for content that comes from that source (e.g., often normalized to match the represented area). For example, sometimes a source will have multiple kinds of content, including content for news, editorials, and guest opinions.

A source bias can be a weighted average of the various content provided by the source. Or in some embodiments, the source bias can include multiple ratings dependent on the type of content. For example, the Wall Street Journal news pages may have a different source bias rating than the Wall Street Journal opinion pages. Thus, a source can be provided as a single entity (e.g., company, corporation, organization), or can be parsed out for different content.

3(b): Participant Ratings.

When the source is a rated participant, the bias rating of the participant can be used for the source bias rating. The bias rating of the participant may be determined any of the techniques described herein or any other method.

3(c): Content Analysis.

Various approaches to rating the bias of a source based on analysis of the content may be utilized. For example, UCLA did a study in 2005 that provided bias ratings on a scale from 1-100 for 70 different organizations, (see UCA results published in Quarterly Journal of Economics (2005) 120 (4): 1191-1237, which is hereby incorporated by reference in its entirety). Research and results like this can be included in the calculation of the source bias. Thus previous research and results about the bias of a source can be leveraged and/or considered. In some instances, the previous research may be used in combination with the other techniques described herein, or alone.

In some instances, private or public databases may be utilized to leverage for source analysis. In some instances, web crawlers or other information gathering techniques may be used to leverage pre-existing bias information.

4. Incorporated Bias Rating.

Bias ratings may be provided for sources, content and/or participants. These ratings may interact and influence each other. The number of factors included and the weighting of each factor may vary according to the data available and through constant evolution. An incorporated bias rating may utilize these various bias ratings and be updated in accordance with the various balances and interactions.

4(a): Dynamic Ratings.

The incorporated bias rating can be dynamic, changing with the most recent data. Unlike studies and surveys that are run once, the incorporated bias rating can be continually evolving as participants continuously take bias tests, rate content and sources, and vote in favor or against different opinions, and more. In some instances, the incorporated bias ratings may be self-learning and may become more accurate over time.

4(b): Rating Confidence.

In some cases, only some data will be available. In that case, the incorporated bias rating may only be partially complete, meaning that the incorporated bias rating can have a lower confidence level in the accuracy of that rating. For example, Participant A may have only completed the self-rating dashboard, while Participant B may have completed the dashboard, survey, and written lots of content that the community has rated. The rating confidence of the bias rating would be lower for Participant A than it would be for Participant B. The rating confidence for the various ratings may or may not be provided to the various users of the system.

Multi-Bias News Coverage

Systems and methods described herein may be useful for multi-bias content. In some examples, the multi-bias content may be media content, such as news coverage. News and opinions can be written from a biased perspective, whether intentional or not. Systems and methods described herein may expose that bias with each article or other forms of content, and may also compare, sort and/or categorize each article/content by bias. This presents a unique perspective of the news and opinions covered in those articles.

Figure 5:
FIG. 5 shows an example of media presented with bias analysis in accordance with an embodiment of the invention.

FIG. 5 shows an example of media presented with bias analysis in accordance with an embodiment of the invention. In one example, media may be arranged in a topical fashion. For example, the topic of gay marriage may be provided. The various forms of content relating to the topic may be provided. In one example, the content may be sorted in accordance with how recent the content is, relevance, popularity, number of hits, or source. In some instances, the display may include a headline or other summarizing information about the content.

Topical organization may occur in accordance with any techniques or methods. In some examples, news article classification may occur in accordance with one or more techniques described in U.S. Pat. No. 8,200,685, which is hereby incorporated by reference in its entirety.

A bias rating may be provided for each of the content displayed associated with the topic. For example, the display may include an assessment that a first article is provided from a center perspective, while a second article may be biased toward the right and/or a third article is biased toward the left. The bias rating may be displayed to be visually associated with the various content. For example, the bias rating may be displayed in a visually mapped manner (e.g., same column and/or row) as a headline. The bias rating may be provided for each headline in a news feed, which may or may not be topically related.

The bias rating itself may have various forms. For example, the bias rating may be displayed as a graphical sliding bar with an indicator for where the article falls along the spectrum. For example, if the bar covers the spectrum from left to right, the bias rating for a center viewpoint may be displayed at the center of the bar, while a bias rating for a left view point is provided at a left end of the bar. Such a display may be provided at discrete interviews (e.g., bias rating falling into one or more of the categories) or may be provided along a continuous spectrum (e.g., falling anywhere along the sliding scale from left to right, or from one numerical value to another).

In other embodiments, a word, number or other symbol may be provided indicative of the bias rating. For example, the bias rating may be displayed as a word indicating "left, lean left, center, lean right, or right". In some instances, the bias rating may have a numerical value (e.g., falling from 0 to 100).

Figure 6:
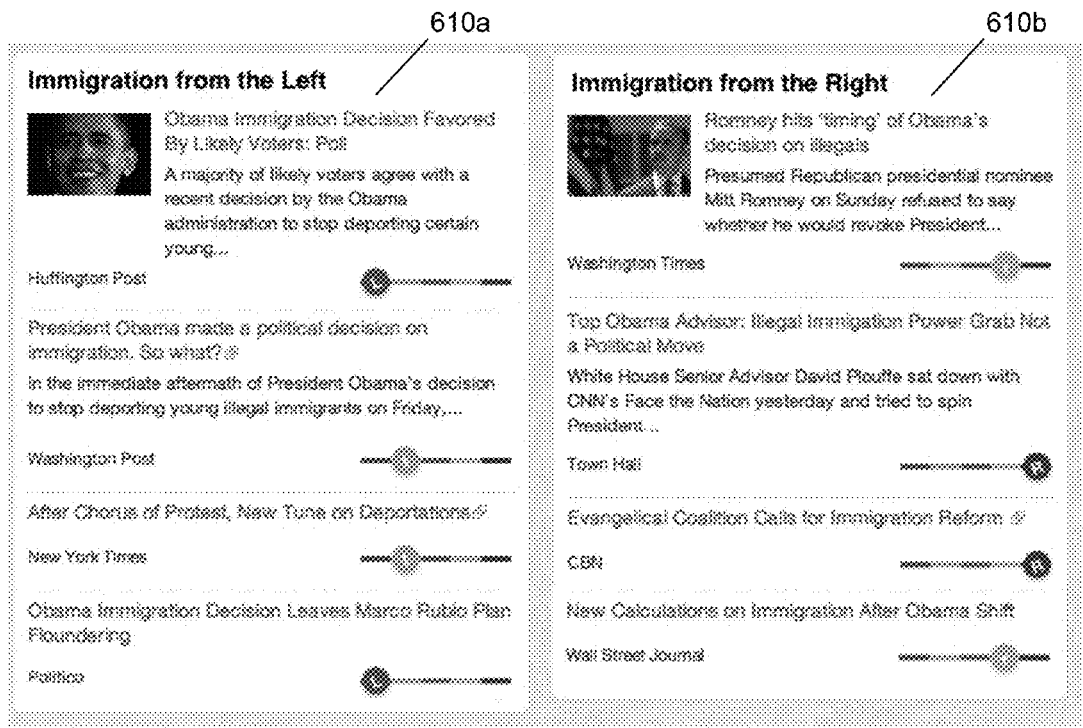
FIG. 6 shows another example of a media display with bias analysis.

FIG. 6 shows another example of a media display with bias analysis. The media display may be provided on a device. The media display may be provided on a user interface of a user device. In some instances, the user interface may be part of a website or application that is accessible by the device.

In some instances, the content may be topical and may provide one or more visual region 610a, 610b for providing different points of view about the topic. For example, the topic may be immigration. One region of a visual display may include content relating to immigration from the political left 610a, while another region may include content relating to immigration from the political right 610b. The visual display may be divided into any number of different categories (e.g., 2, 3, 4, 5, 6 or more). Such categories may represent different viewpoints for content. Each category may be displayed in a separate region. The regions may be adjacent to one another.

Content may be sorted according to the different categories. The content may be displayed in the categories into which they fall. For example, articles that have a politically left viewpoint may be provided in the immigration from the left section, while articles that have a political right viewpoint may be provided in the immigration from the section. In some instances, the bias rating for the content may be provided in a visually mapped manner relative to the content. Alternatively, no bias rating may be displayed, as the content may already be categorized to some extent.

In some instances, the categories for display may or may not be broader than the categories provided in the bias rating scale. For example, five categories may be provided in the bias rating scale (e.g., left, lean left, center, lean right, and right). The category regions may be provided only for left and right. The left may encompass left and lean left, while the right may encompass right and lean right. In alternative embodiments, the category regions in the display may match up or be the same number as categories provided in a bias rating scale.

Figure 8A:
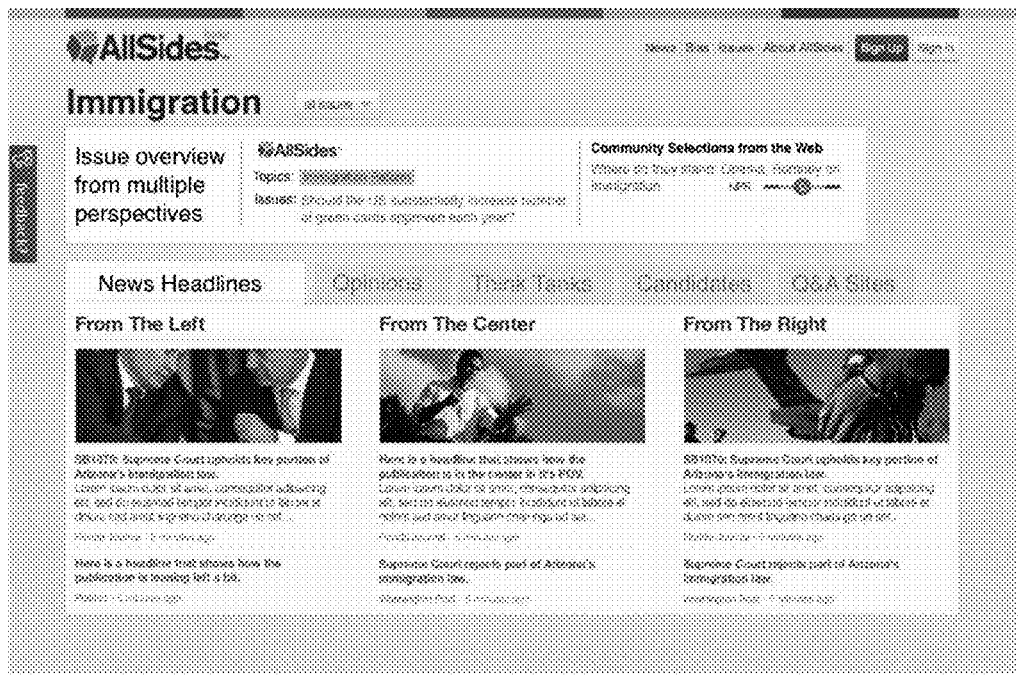
FIG. 8A provides an additional example of a presentation of articles with bias analysis applied to news, opinions and other categories of sources.

The category regions on the display may be provided in a visually distinct manner. The category regions may be provided adjacent to one another. The category regions may take up different columns and/or rows (see, e.g., FIG. 8A, FIG. 8B). In some instances, a border or other visual demarcation may be provided between category regions. FIG. 8A shows another example of a presentation of media with bias analysis. In one example, views from the left, center, and right may be provided in different columns, rows, or other regions. For example, news headlines of articles from the left may be shown in a left column, news headlines of articles from the right may be shown in a right column, and/or news heads of articles from the center may be shown in a center column.

Figure 8B:
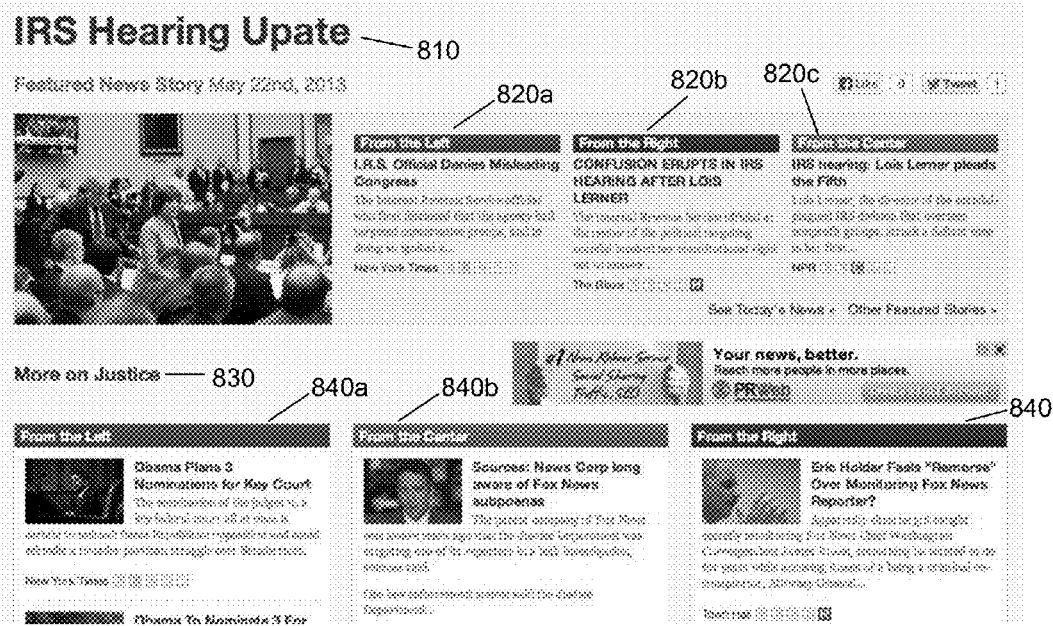
FIG. 8B provides another example of a presentation with bias analysis.

FIG. 8B provides another example of a presentation with bias analysis. For instance, media content may be provided with views from the left, right, and center in different columns, rows, or regions. For a specific event or topic 810 (such as the IRS Hearing Update provided in FIG. 8B), the various points of views may be shown in different columns 820*a*, 820*b*, 820*c* (e.g., news articles from the left may be shown in a left column, news articles from the right may be shown in a center column, and news articles from the center may be shown in a right column). In some embodiments, other content from a similar topic 830 (e.g., from Justice as shown in FIG. 8) may be shown in another region and may be divided according to points of view 840*a*, 840*b*, 840*c* (e.g., news articles from the left may be shown in a left column, news articles from the right may be shown in a right column, and news articles from the center may be shown in a center column). In some instances, a display may simultaneously show a specific topic and the content relating to the specific topic divided by bias category, and/or a general topic relating to the specific topic and the content relating to the general topic divided by bias category. In some instances, a display may simultaneously show multiple related topics and content relating to each of the related topics divided by bias category.

The content displayed in accordance to their point of view may include an indicator of the source of the content. For example, if an article came from the New York Times, the news source name may be provided. Furthermore, a bias rating for the content may be displayed. For example, if an article has already been rated as leaning toward the right, a visual display may highlight that the article leans toward the right. In some instances, the various bias categories for the content may be displayed. The bias category into which the content has been determined to fall may be highlighted. Optionally, each of the content items (e.g., each news article) may include the bias rating. Alternatively, some of the content items may not have a bias rating.

Figure 7:
FIG. 7 provides an additional example of a presentation of media with bias analysis.

FIG. 7 provides an additional example of a presentation of media with bias analysis. The media may be presented on a device of a user.

The content may be provided. The content may or may not be related to a specific topic. In one example, the content may be news content related to immigration.

Content from various sources may be provided. The source of the content may be displayed in a visually mapped manner with the content. The bias rating for the content may be provided. In some embodiments, there may be visually distinct regions in which content summary (e.g., headings), content source, and bias rating may be displayed.

Figure 9A:
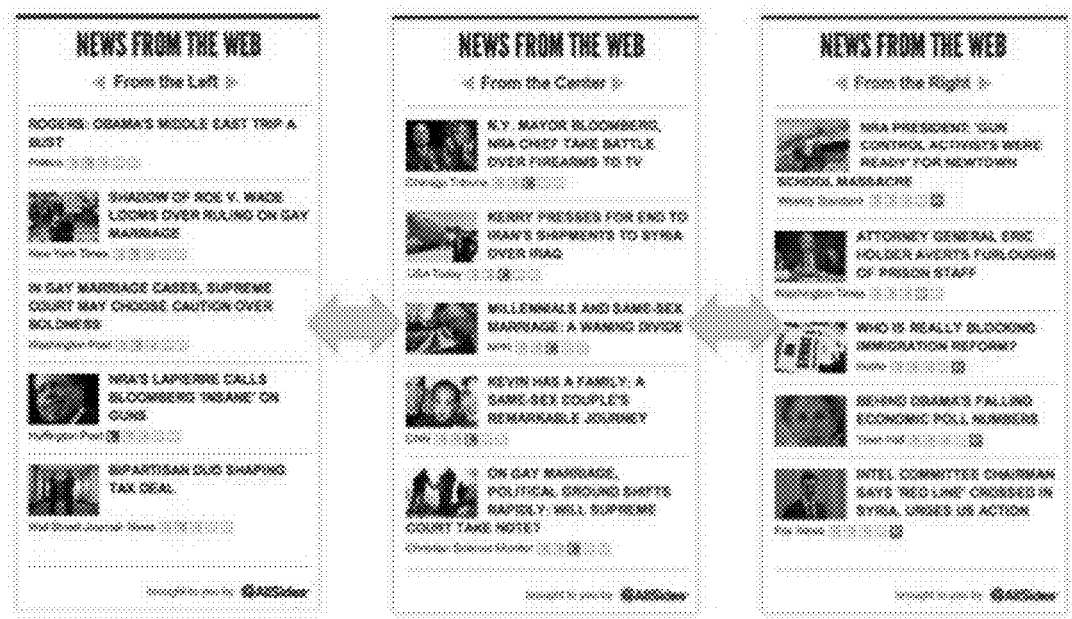
FIG. 9A shows an example of a presentation of bias analysis provided by a third party source.

FIG. 9A shows an example of a presentation of bias analysis provided by a third party source. In some instances, a third party source may utilize the services of a bias rating system, and may display the results on the third party page. A third party source may be a different entity from an entity operating a bias rating system. Content falling within a particular bias category may be provided within a first region, and content falling within another bias category may fall into a second region. Content falling into a third bias category may be provided in a third region. For example, news from the left may be presented in a first region, news from the center may be provided in a second region, and news from the right may be provided in a third region. The regions corresponding to different bias categories may be shown simultaneously. For example, all three regions may be displayed together. Alternatively, the regions may be swapped out or shown sequentially. For example, only news from the left may be shown at one point in a time, a user may swipe to see news from the center, and swipe again to see news from the right. The user may be able to toggle or travel back and forth between the various screens corresponding to different bias categories.

The content displayed may or may not include the source of the content (e.g., news source for an article). The content displayed may or may not include the bias rating for the content (e.g., whether an article is in the left, leans left, is in the center, leans right, or is in the right).

FIG. 9B shows another example of a media presentation provided by a third party. For example, the third party may be a news site, which may show one or more headlines. The headlines may be divided according to bias category. For examples, the headlines with a bias from the left, the headlines with a bias from the center, and the headlines with a bias from the right may be visually segregated from one another. For example, a column may be provided for articles with a left-leaning bias, separate column may be provided for articles with a right leaning bias, and a separate column may be provided for articles from the center. The news source and/or bias ratings for each headlines/article may be provided.

Figure 10:
FIG. 10 provides an example of a sidebar useful for bias rating in accordance with an embodiment of the invention.

FIG. 10 provides an example of a sidebar 1010 useful for bias rating in accordance with an embodiment of the invention. The sidebar may be displayed simultaneously with content 1020. For example, the content may be a news article, and the sidebar may be displayed adjacent to the news article. The source of the news article may be displayed.

The sidebar 1010 may present an option for a user to rate the content's bias 1030. One or more bias categories may be presented. A participant may select a bias category to provide the participant's feedback for the content. For example, a participant may see an article that the participant is leaning to the right. The participant may select an option for leaning to the right, thus providing feedback on the article bias. In some instances, the participant may know the source of the content the participant is rating.

A sidebar may also provide an option for the participant to share the content via social media 1040 (e.g., Facebook, Twitter, Google+, LinkedIn, or any other social media site).

In some instances, additional content 1050 relating to the displayed content 1020 may be provided. For example, the selected content may be of a particular topic, and the additional content may fall within the same topic. For example, the selected content may be a news article, and related news articles may also be displayed in the sidebar. The additional content may include a source of the content and may optionally include bias ratings for the content. For example, additional related news articles may be shown with their political leanings.

The sidebar may be presented on a site for the bias rating system, or from a third party site.

Figure 11:
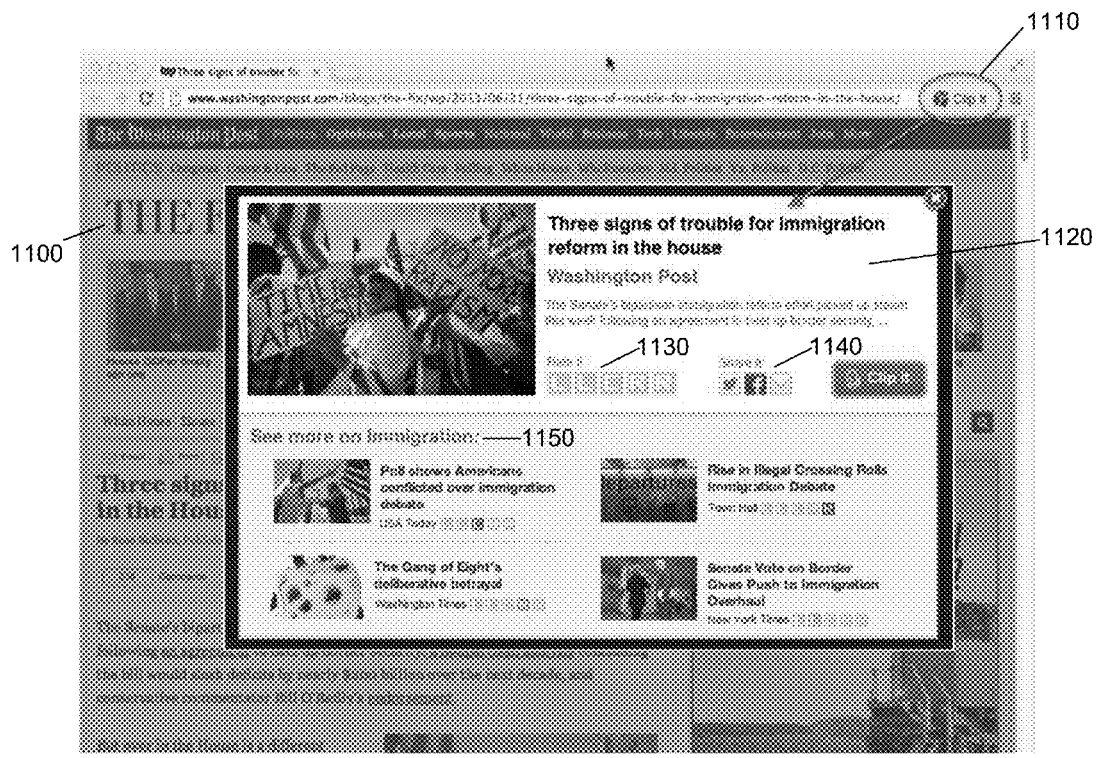
FIG. 11 illustrates an example of a plug-in useful for bias rating.

FIG. 11 illustrates an example of a plug-in useful for bias rating. A user may see content 1100 that the user wishes to rate. A browser plug-in 1110 may be presented. Selecting the plug-in may cause a display 1120 to be presented that allows the user to rate the content. The display may be presented as a pop-up.

The display 1120 may present an option for a user to rate the content's bias 1130. One or more bias categories may be presented. A participant may select a bias category to provide the participant's feedback for the content. For example, a participant may see an article that the participant is from the center. The participant may select an option for a central view, thus providing feedback on the article bias. In some instances, the participant may know the source of the content the participant is rating.

The display 1120 may also provide an option for the participant to share the content via social media 1140 (e.g., Facebook, Twitter, Google+, LinkedIn, or any other social media site). The display may also present the participant to clip the content and/or view it later.

In some instances, additional content 1150 relating to the displayed content 1100 may be provided. For example, the selected content may be of a particular topic, and the additional content may fall within the same topic (e.g., immigration). For example, the selected content may be a news article, and related news articles may also be displayed in the pop-up display. The additional content may include a source of the content and may optionally include bias ratings for the content. For example, additional related news articles may be shown with their political leanings FIG. 12 provides an example of bias rating by direct feedback presenting a user with an option to agree or disagree with a bias rating. For example, a user may see content or a source already having a bias rating. The user may choose to agree or disagree with the bias rating. For example, a bias rating system may have determined a bias rating 1220 for a news source 1210 (e.g., New York Times).

An option may be presented to the participant to agree or disagree 1230 with the existing rating. If the user disagrees, the user may be presented with an option 1240 to rate the content or source. For example, if the user disagrees that a news source has a left political bias, the user may select an option to disagree and may select from the various political bias options. The user may select a new rating.

The option to agree or disagree with a pre-existing rating may apply to sources and/or content.

FIG. 15 provides an example of bias ratings for various sources. For example, the bias ratings may be presented for multiple news sources. The bias ratings for the sources may be determined in accordance with any of the methods described herein. The bias ratings sources may include ratings by participants on the bias of the source or content from the source. The source may optionally self-identity or self-rate biases.

In some instances, a bias rating system may present a display listing various sources and the related biases. One or more bias categories may be provided for each source. In some instances, each source may be shown with the same bias categories (e.g., left, lean left, center, lean right, right). The bias category into which the source falls may be visually emphasized. For example, the bias category may be darker or highlighted in some manner. In some embodiments, the bias category that the source falls into the most may be the only category highlighted. Alternatively, multiple categories may be highlighted to some extent while the category into which the source falls into the most may be highlighted or visually emphasized the most. In some instances, each bias category may be highlighted to the extent to which they receive ratings. For example, if multiple individuals rate a news source, and the vast majority of them rate the news source as "left", the "left" bias category may be strongly highlighted, while if some individuals rate a news source as "right" and some individuals rate a news source as "leaning right", both categories may be highlighted to some extent.

In some embodiments, a user may be presented with an option to agree or disagree with a rating of a source.

Figure 16:
FIG. 16 provides an example of source differentiation for a product review.

FIG. 16 provides an example of source differentiation for a product review. Categorization of information may occur for any type of content, and need not be limited to news or media content. Examples of other categorizations of information may relate to finance, sports, health, arts, technology, or any other area. In one example, content may be a product review. In some instances, a topic may be a particular product. Product reviews for the selected product may be organized and visually displayed in accordance with their source. For example, the product reviews from the product provider may be presented in a first column, product reviews from reviewers may be presented in a second column, and product reviews from consumers may be presented in a third column.

In some instances, the content may be displayed in a visually segregated manner in accordance with their detected bias.

FIG. 17 shows examples of various types of bias ratings. In some embodiments, information may be presented and visually segregated according to the different bias categories.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A method for displaying content in accordance with content bias ratings, said method comprising:
   receiving content from one or more sources;
   receiving, via a user input device, bias ratings from one or more participants for the content;

calculating, with aid of a programmable processor, a content bias rating for the content based on the bias ratings from the participants;

generating, with aid of the programmable processor, a user interface shown on a display based on the content bias ratings; and showing, using a display, a user interface showing the content, wherein the content is divided into visually distinct regions such that content having a content bias rating falling within a first range is shown in a first region and content having a content bias rating falling within a second range is shown in a second region.

2. The method of claim 1 wherein the content bias rating is calculated, with aid of the programmable processor, also based on a source bias rating of the one or more sources.

3. The method of claim 2 wherein the content bias rating is calculated, with aid of the programmable processor, also based on a participant bias rating of the participants.

4. The method of claim 1 wherein the user interface shows the content bias ratings for the content.

5. The method of claim 4 wherein an individual content bias rating is displayed as a visually highlighted bias rating category from a plurality of bias rating categories.

6. The method of claim 4 further comprising:

presenting, using the display, an option for a participant to agree or disagree with a content bias rating;

receiving, via a user input device, a selection from the participant to agree or disagree with the content bias rating; and receiving, via the user input device, the bias rating from the participant when the participant selects an option to disagree with the content bias rating.

7. A method for determining bias rating categories, said method comprising;

providing one or more dimensions of bias;

providing, via a display, content to a plurality of survey participants;

receiving, via a user input device, ratings along the one or more dimensions of bias for the content from the plurality of survey participants;

calculating, with aid of a processor, the placement of results along the one or more dimensions of bias based on the ratings collected from the plurality of survey participants; and selecting, with aid of the processor, results falling into concentrated cluster regions along the one or more dimensions as bias rating categories.

8. The method of claim 7 further comprising:

presenting, via a display, content to a participant along with the selected bias rating categories; and receiving, via a user input device, a selection of an individual bias rating category from the selected bias rating categories from the participant for the content.

9. The method of claim 7, wherein a number of bias rating categories is predetermined and said selecting step includes selecting the predetermined number of bias categories.

10. The method of claim 7, wherein a predetermined threshold is provided for the concentration of the cluster regions, and said selecting step results in the selection of bias categories relating to clusters having concentrations that exceed the predetermined threshold.

11. The method of claim 7, wherein the bias rating categories encompass a plurality of dimensions.

* * * * *